INVENTORS
CLARENCE F. LUCK, JR.
DANILO V. MISSIO
GEORG RUPPRECHT

BY Lawrence B. Benjamin
AGENT

United States Patent Office 3,383,621
Patented May 14, 1968

3,383,621
LASER CRYSTAL WITH PRISMATIC END SURFACE
Clarence F. Luck, Jr., Waltham, Danilo V. Missio, Arlington, and Georg Rupprecht, West Newton, Mass., assignors to Raytheon Company, Waltham, Mass., a corporation of Delaware
Continuation of application Ser. No. 176,498, Feb. 26, 1962. This application May 18, 1962, Ser. No. 197,814
3 Claims. (Cl. 331—94.5)

This application is a continuation of our abandoned application filed Feb. 26, 1962, Ser. No. 176,498.

This invention relates to maser devices and, more particularly, to an improved means in devices such as optical masers wherein larger quantities of input activating radiation than heretofore possible are directed into the medium utilized to produce coherent stimulated output radiation.

The optical maser is an energy converter that produces electromagnetic radiation in the optical region of the spectrum. This electromagnetic radiation has the subtle property of coherence. These coherent waves are usually distinguished from other forms of propagation by having surfaces of constant phase moving away from the source with the velocity of propagation. Additionally, these coherent waves are further distinguished by the fact that the wave length spread of coherent radiation is very small.

One of the devices producing the coherent radiation commonly used in the art is synthetically produced ruby crystals containing a small percentage of chrome oxide in aluminum oxide. The energy conversion process consists of converting electric energy that has been accumulated or stored in a device such as a capacitor to a brief but intense flash of electromagnetic energy. This light energy is pumped into the ruby where it is converted into a coherent self-collimated beam by quantum mechanical processes.

Since the mechanics of converting the input energy to the ruby rod to the different energy levels with the resultant amplification of light is well-known in the art, any exegesis is unnecessary. Suffice to say, the present state of the art involves a discharge of the accumulated electric energy through a flash tube to produce a random light. It is imperative that all or most of the light be focussed on the ruby rod so that the overall efficiency of the system is maintained at a relatively high level. Along these lines, flash tubes may be spirally wound about the ruby rod. In a copending application, Ser. No. 155,651, filed Nov. 29, 1961, entitled, "Device for Producing Electromagnetic Radiation," and assigned to the assignee of the instant application, there is shown still another configuration wherein the flash tube and the ruby rod are placed at opposite foci of an elliptically-shaped cavity.

All of the prior art methods have some drawbacks in that the presence of the flash tube outside of the ruby rod causes an appreciable amount of the energy radiated by the flash tube to be lost.

To overcome these difficulties, we propose that a hollow tubular rod be used with a flash tube concentric within the rod. By so doing, all of the energy given off by the flash tube is utilized and the efficiency of the maser is increased many fold.

It is, therefore, an important object of the present invention to provide a high efficiency maser device.

Another important object of the present invention is to provide a device wherein the flash tube and the energy conversion rod are in closer proximity than heretofore possible.

Still another important object of the instant invention is to provide a device which utilizes the entire output of the flash tube.

Yet another object of the present invention is to produce a lighter weight and portable optical maser.

A further important object of the instant invention is to provide a flash system which lends itself to producing a considerably smaller optical maser.

The features of our invention which we believe to be novel are set forth with particularity in the appended claims. Our invention itself, however, both as to its organization and method of operation, together with further objects and advantages thereof, may be best understood by reference to the following description, taken in conjunction with the accompanying drawings in which:

While FIG. 1 is illustrative of one embodiment of our invention, it is to be understood that this embodiment is not preferred to the exclusion of others and we do not wish to be so limited. In addition, it will be seen that similar elements in each of the figures are similarly numbered.

Figure 1:
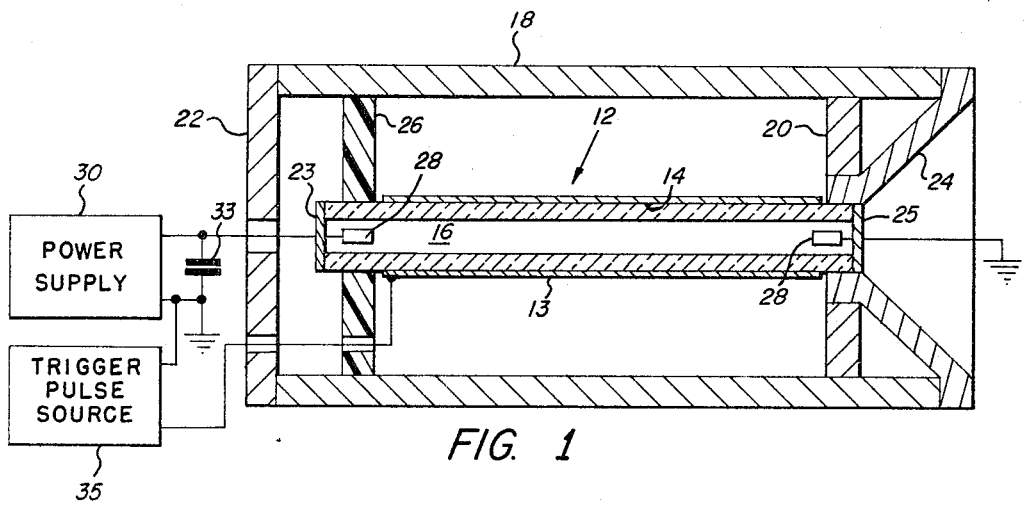
FIG. 1 is an enlarged, axial, cross-sectional view of a simplified form of an optical maser showing one embodiment of our invention.

Referring now to FIG. 1, there is shown one particular embodiment of our invention wherein the ruby maser 12 is shown, in this instance, as having a reflective coating 13 on the outer scattering surface 14. The operation of scattering surface 14 will be discussed in greater detail in the explanation associated with FIG. 3. An inner tubular aperture 16 extends coaxially through ruby maser 12. Thus, the axes of both the aperture 16 and ruby rod 12 is coincident. Cavity 18 may be of any suitable material and configuration to provide a protective coating for ruby 12 and, while shown generally in the form of a cavity, it is to be understood that it may also take the form of a surrounding protective material or any other protective structure configuration. If a protective cavity is used as shown, then it will be necessary to provide end plates 20 and 22, which conform to the configuration of cavity 18, and substantially close the interior of the compartment formed thereby. The conical port 24 which appears at one end of ruby rod 12 may or may not be used, as desired; it being unnecessary for the operation of our invention. One end of ruby rod 12 has a reflecting surface 23 applied thereon so that it is completely reflective. The other end of ruby rod 12 has a partially reflective coating 25 thereon so as to provide a desired amount of reflection and feedback and, conversely, to allow the desired amount of light to be passed therethrough. Support 26 is used in conjunction with cavity 18 to provide a suitable support for the ruby rod. Cavity 16 may then be filled with an appropriate gas and the ends suitably closed or plugged to prevent any escape of the gas. Thus, when power supply 30 appropriately charges the capacitor bank, which is here represented by single capacitor 33, a trigger pulse emanating from trigger source 35 will appropriately ionize the gas in cavity 16, thereby generating the light to be transmitted through rod 12. It should be here noted that the reflective coating 13 is conductive and may replace the helically wound wire which has been previously used as a trigger for initiating the firing of the tube. It should be understood that electrodes 28, during the charging of capacitor bank 33, have the full voltage of the charge appearing therebetween.

Figure 2:
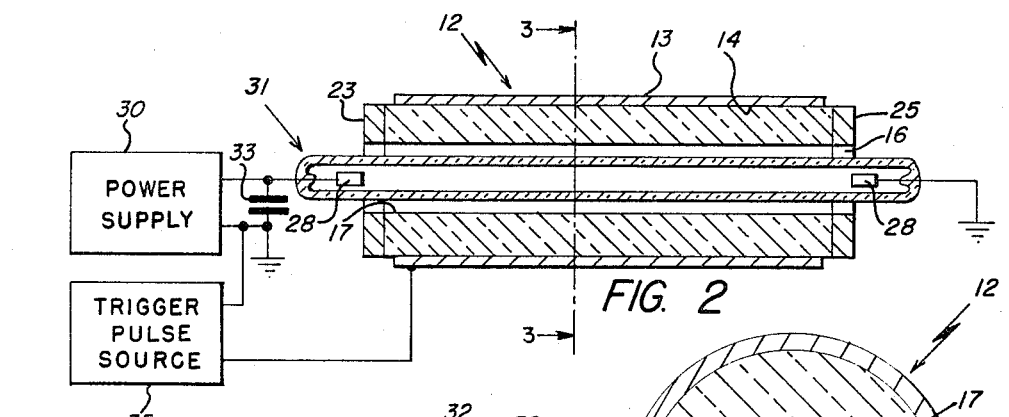
FIG. 2 is an enlarged, axial, cross-sectional view of another embodiment of the ruby maser.
Figure 3:
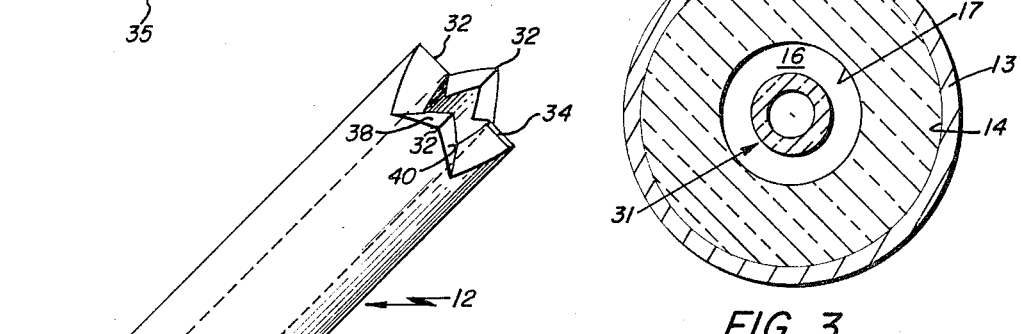
FIG. 3 is an enlarged, cross-sectional view of the ruby rod embodying the principles of our invention taken along the lines 3—3 of FIG. 2.

Referring now to FIGS. 2 and 3 there is shown an enlarged view of another embodiment of our ruby rod 12. However, in this embodiment, a separate flash tube 31 is shown in aperture 16. Also, the reflective coating 13 is shown in more detail on the outer surface 14 of the ruby rod. In this latter embodiment, while not shown, it is also possible to use a very thin wire helically wound or wrapped around the outer surface of the flash tube 31, thus obviating the need for connecting the source of trigger pulses directly to coating 13. However, in some instances, the helically wound wire may be necessary. For a showing of the helical wire wound about the flash tube and used as a trigger for initiating the firing of the tube, attention is directed to copending application, Ser. No. 155,651, filed Nov. 29, 1961, entitled "Device for Producing Electromagnetic Radiation" and assigned to the same assignee as the instant application.

As a further advantage associated with the structure of FIGS. 2 and 3, it will now become obvious that the space which exists between inner surface 17 of the ruby rod 12 and the outer surface of tube 31 may be utilized to more easily obtain higher peak powers. This space may be used to accommodate a coolant which, when passing through, between surface 17 and tube 31, will effectively cool both the ruby rod 12 and gas tube 31. This will allow higher peak power to be applied to tube 31, or, alternatively, pulses of longer duration may be applied. In any event, higher outputs are thus obtainable by means of the effective use of a coolant.

In our invention, a hollow tubular ruby is used with a flash tube concentric within the hollow tubular portion. As will be obvious to those skilled in the art, in the interest of efficiency, the inner diameter 17 of the ruby rod 12 should be highly polished and, if necessary, lapped to insure loss-free transmission through the surface. On the other hand, it now becomes imperative that the surface of the outer diameter 14 be made a loss-free scatterer. One method of making surface 14 a scatterer is to leave it rough ground and coat it with a silver or magnesium oxide coating 13.

In this manner, light leaving the flash area (as represented by hollow portion 16, FIG. 1 and tube 31, FIG. 2) entering the ruby normal to inner surface 17, travels to the outer scattering surface 14 having the reflective coating 13 thereon. At surface 14, some of the light is directed back, normal to surface 17 where it passes through aperture 16 to a diametrically opposed portion of surface 17, and this portion of the light then is reflected back and forth between the surfaces. However, most of the light is scattered after it hits surface 14 and is directed into the space occupied by the ruby material between surfaces 14 and 17. Each time that light strikes surface 14, it is scattered and the scattered light may now strike another portion of surface 14 to be again scattered. Additionally, the light that strikes the surface 17 at a sufficient angle for interior reflection also remains within the ruby.

As in prior art optical masers, the ends of the ruby tube must be made reflecting in order to provide the necessary optical feedback. One method for accomplishing this is to grind the ends parallel to each other and make them optically flat. Thereafter, reflective coatings are placed thereon. However, one end has a coating 23 which is completely reflecting while the other end has a coating 25 which is semi-transparent to provide the output therefrom.

Figure 4:
FIG. 4 is an enlarged isometric representation of a ruby rod depicting still another embodiment of our invention.

Still another method for providing the necessary optical feedback is set forth in FIG. 4. This method provides a series of prisms to accomplish total internal specular reflection. A prism system may be utilized using specially ground ends affixed to the ends of the ruby rod and made from a glass having an index of refraction which ideally but not necessarily matches the index of refraction of the ruby, or alternatively may be prisms that have been specially ground on the ends of hollow tubular ruby rod 12. These are shown generally as elements 32 in FIG. 4. It should be noted that the vertex edges or apices of each prism set placed at one end of the ruby rod 12 are located opposite the valleys of the prism set located at the other end of the ruby rod. Thus, a ray of light generated by the masing phenomenon is, for example, reflected off surface 36, will strike surface 44, then be directed up to surface 38, then to surfaces 40 and 42 and to successive sides of the prism until such time that it arrives at the flattened prism vertex 34, at which time it manifests itself as the output of the optical maser.

Figure 5:
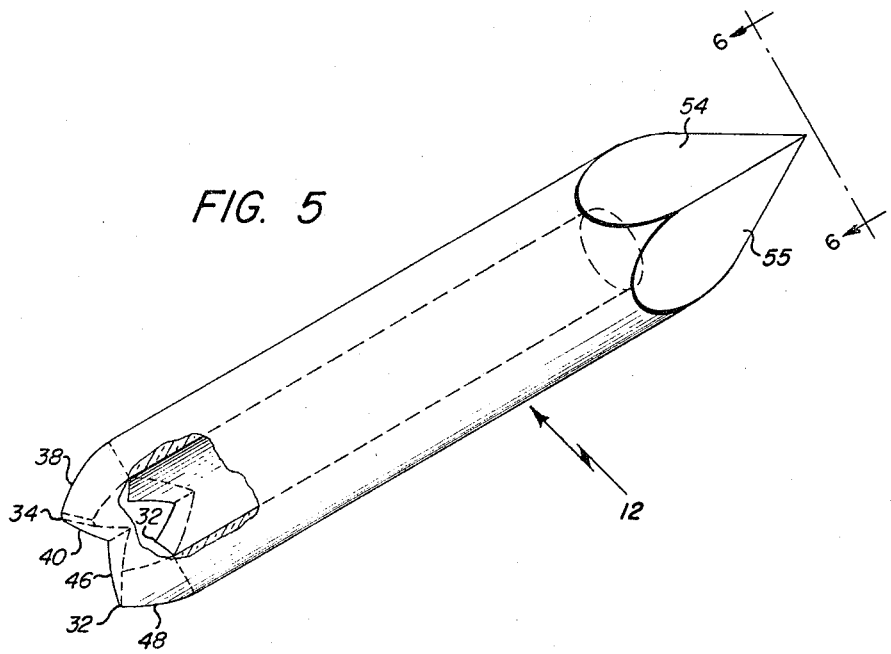
FIG. 5 is an isometric representation of an energy converter for producing coherent stimulated output radiation depicting still another embodiment of our invention utilizing prisms at one end of the rod and a corner reflector at the other end of the rod.
Figure 6:
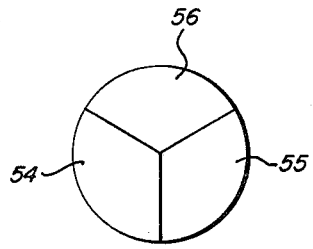
FIG. 6 is an end view of FIG. 5 taken along the lines 6—6.

Another method of providing the necessary optical feedback is set forth in FIGS. 5 and 6. In this embodiment, the reflecting prisms described in FIG. 4 are affixed to one end of the rod material and are made from a glass or other material having an index of refraction which ideally but not necessarily matches the index of refraction of the material of the rod. Alternately, the prisms may be specially ground on the ends of rod 12. In this embodiment, instead of having prisms at both ends of the rod, as shown in FIG. 4, there is shown a reflecting device which is similar to a corner reflector at the other end having at least three facets, 54, 55 and 56. Thus, a ray of light generated by the masing phenomenon is, for example, reflected off surface 38 to strike surface 40 to be then reflected toward the other reflector end, where it will be reflected off of surfaces 54, 55 and 56, and sent back down the rod to be reflected from another surface of one of the prism sets. This action continues until the now collimated and coherent light arrives at the flattened prism vertex 34, at which time it manifests itself as the output of the optical maser. As in FIG. 4, the prisms are shown generally as elements 32 having reflecting surfaces.

Figure 7:
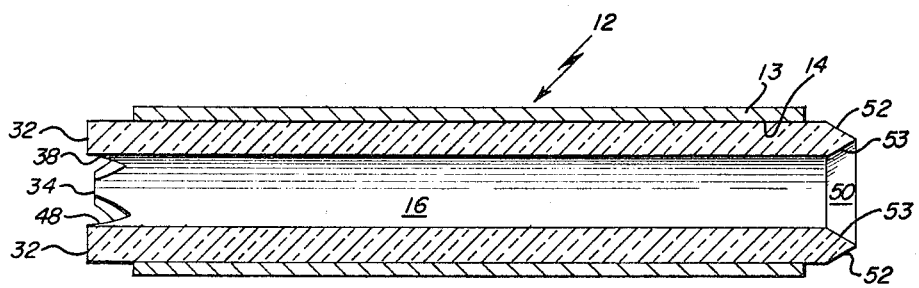
FIG. 7 is an enlarged isometric representation of an energy converter for producing coherent stimulated output radiation depicting yet another embodiment of our invention.

Still another embodiment of our invention is depicted in FIG. 7 wherein the hollow tubular masing material 12 having at one end thereof, prism sets 32, one of which has a flattened vertex 34. As in the previous figures, surface 14 is rough ground so that it will present a scattering surface and is coated with a silver or magnesium oxide reflective coating 13, as previously described. In this embodiment, the other end of the rod material has a generally tapered form defining a prismatic chisel-shaped toroiol 50 having an inner surface 53 and an outer surface 52. In this configuration, any of the light rays generated in the body of the rod and reflected from the surfaces of the prism sets 32 are reflected over toward end 50, to be reflected from surfaces 52 and 53, and thence back to prism sets 32. The important consideration in this configuration resides in the fact that the surfaces 52 and 53 should not define a 90° angle. Thus, if surfaces 52 and 53 are always maintained at an angle greater or less than 90°, the ray of light that leaves prism set 32 will strike surface 52, for example, be reflected to surface 53 and then, because of the fact that this angle is other than 90°, the light will not go down the rod material parallel to the axis. Instead, this light will bounce back and forth alternately between surface 14 and the surface defined by aperture 16 on its way down toward prism set 12. This, then, serves the purpose of providing a much longer path for the light to travel and, thus, provides a greater masing action in a given volume, thereby producing a greater light output at flattened vertex 34.

While we have described the masing material used herein as being one of the more common coherent radiation producing media (synthetically produced ruby crystals containing a small percentage of chromium oxide in aluminum oxide) we do not wish to be so limited. There are other exotic media which may, under proper circumstances, be pumped to produce an optical maser. These materials may be either solids, gases or liquids.

The solid media are found generally in the Lanthanide or Rare Earth group and may, for example, be any one of the following: neodymium doped barium crown glass; praseodymium doped calcium tungstate; neodymium doped calcium tungstate; samarium doped calcium fluoride; dysprosium doped calcium fluoride; holmium doped calcium tungstate; erbium doped calcium tungstate; thulium doped calcium fluoride, and thulium doped calcium tungstate, to name just a few. Additionally, it has also been found that uranium doped calcium fluoride has utility as a solid state masing material in addition to the previously mentioned Rare Earth group materials and ruby doped with chromium.

The gaseous masing media include materials such as vapor of the alkali metals; namely, lithium, sodium, potassium, rubidium and cesium, as well as mixtures of helium and neon.

An example of a liquid masing medium is a two-level device which is capable of taking advantage of the Overhauser effects in low-viscous liquids to obtain excess population of upper energy levels namely, tetrachlorosemiquinone.

While there has been described what is presently considered a preferred embodiment of the invention, it will be obvious to those skilled in the art that various changes and modifications may be made therein without departing from the inventive concept contained therein, and it is, therefore, aimed in the appended claims to cover all such changes and modifications as fall within the true spirit and scope of the invention.

What is claimed is:

1. In combination, a device producing coherent radiation, and pumping means for supplying input energy to the device to produce the coherent radiation, the axes of the device and the pumping means being coaxial and coincident, the ends of the device being provided with a set of prisms, the apices of the set of prisms on one end being located opposite the valleys of the set of prisms on the other end.

2. In combination, a device producing a coherent radiation, and pumping means for supplying input energy to the device to produce the coherent radiation, the device encircling the pumping means, the ends of the device each being provided with a set of prisms, the apices of the set of prisms on one end being located opposite the valleys of the set of prisms on the other end.

3. An energy converter for producing electromagnetic energy in the optical region of the spectrum comprising in combination, a hollow cylindrical ruby rod, and a flash device within the hollow portion of the rod, the rod comprising an envelope for the flash device, the ends of the ruby rod each being provided with a set of prisms, the apices of the set of prisms on one end being located opposite the valleys of the set of prisms on the other end, the apex of one of the prisms on one end of the rod being flat to provide an output from the rod.

References Cited
UNITED STATES PATENTS

| 3,170,982 | 2/1965 | Hemstreet et al. | 350—286 |
| 3,215,949 | 11/1965 | Garrett | 331—94.5 |
| 3,308,395 | 3/1967 | Sorokin | 331—94.5 |
| 3,102,920 | 8/1963 | Sirons. | |

OTHER REFERENCES

Gould et al., "Self-Aligning Fabry-Perot Interferometers for use as Laser Resonators," Journal of the Optical Society of America, vol. No. 51, No. 12 (p. 1467) December 1961.

Trion, "Total Internal Reflecting Geometry Ruby Rods" Technical Bulletin T–1261–1, December 1961.

Vogel et al., "Lasers: Devices and Systems—Part I," Electronics, October 1961.

JEWELL H. PEDERSEN, *Primary Examiner.*

R. L. WIBERT, *Assistant Examiner.*